United States Patent [19]

Fend

[11] Patent Number: 5,707,089
[45] Date of Patent: Jan. 13, 1998

[54] DEVICE FOR PRESSING TWO FLANGES OF A PIPE CONNECTION AGAINST ONE ANOTHER

[76] Inventor: Heinrich Fend, Zehntenweg 4, 9470 Buchs, Switzerland

[21] Appl. No.: 696,164

[22] Filed: Aug. 13, 1996

[30] Foreign Application Priority Data

Aug. 14, 1995 [CH] Switzerland .............. 2330/95

[51] Int. Cl.⁶ ................................. F16L 23/00
[52] U.S. Cl. .............................. 285/411; 285/367
[58] Field of Search ................... 285/411, 367, 285/410; 24/282, 24, 25

[56] References Cited

U.S. PATENT DOCUMENTS

| | | | |
|---|---|---|---|
| 2,353,572 | 7/1944 | Kuster et al. | 285/411 X |
| 2,878,041 | 3/1959 | Hobbs | 285/411 X |
| 3,029,095 | 4/1962 | King et al. | 285/411 |
| 3,600,770 | 8/1971 | Halling | 285/411 X |
| 4,191,410 | 3/1980 | Voituriez et al. | 285/411 X |
| 4,781,406 | 11/1988 | Hubener | 285/411 X |

*Primary Examiner*—Dave W. Arola
*Attorney, Agent, or Firm*—Young & Thompson

[57] ABSTRACT

The device contains a tension chain with link plates (10) and thrust pieces (7) which are joined to one another via joints (9). Each thrust piece (7) has two flanks (5, 6) for abutting flanges (1, 2) of the pipe connection. The first of flanks (5) is tilted to plane (E1) which is perpendicular to the axes of joints (9) at a first angle. Second flank (6) with this angle forms a second smaller angle. The second angle can be equal to zero. Furthermore, the device contains tensioning device (21) for drawing two adjacent joints (9) against one another. Tensioning device (21) is arranged such that tensile forces (A) exerted by it run on the side of plane (E1) which faces away from second flank (6). Plane (E1) is perpendicular to the axes of joints (9) and passes though edge (B) of first flank (5) which is nearer second flank (6). The device is suitable for flanges (1, 2) which are differently conical or of which one (2) can also be flat externally.

9 Claims, 4 Drawing Sheets 10  7  9  21  20  22  9  11  7  10

10  7  9  21  20  22  9  11  7  10

DEVICE FOR PRESSING TWO FLANGES OF A PIPE CONNECTION AGAINST ONE ANOTHER

FIELD OF THE INVENTION

The invention relates to a device for pressing two flanges of a pipe connection against one another, with a tension chain with link plates and thrust pieces which are joined to one another to swivel via joints with parallel axes, the thrust pieces each having two flanks for resting against the flanges, and with at least one tensioning device for drawing two adjacent joints against one another.

BACKGROUND OF THE INVENTION

Between the flanges of the pipe connection there is generally a seal.

These devices, in which two conical flanges can be surrounded by a tension chain and can be pressed axially against one another by drawing this chain together by means of a suitable closure which is installed for fast opening and closing, are known in different versions. The devices can ensure a tight connection which, depending on the design, is also suitable for metal washers or which can also withstand high overpressures.

The tension chains of the known devices however have all major disadvantages.

Moreover, all these devices are used only to draw two conical flanges together. Therefore if they are not used in new installations, additional costs will be high. There are many cases in which it would be desirable to draw together with a conical flange an existing flange which is made cylindrical, i.e., has a flat outside, by a quick-action tensioning device, for example, to provide a flange welded to an apparatus with a blind flange which can be quickly removed without loosening many screws.

SUMMARY OF THE INVENTION

Therefore the object of the invention is to solve this problem and to make available a device of the initially mentioned type which is light and cheap and nevertheless enables reliable operation without problems.

The device according to the invention with which this object is achieved is characterized in that the first of the flanks of each thrust piece is tilted at a first angle to the plane perpendicular to the axes of the joints, that the second flank of each thrust piece forms a second angle which is smaller than the first angle with the plane perpendicular to the axes of the joint, and that the tensioning device is arranged such that the tensile forces exerted by it on the two adjacent joints run on the side of a plane facing away from the second flanks; the plane is perpendicular to the axes of the joints and passes through the edge of the first flank of each thrust piece which is nearer the second flank.

In the device according to the invention the advantages of existing tension chains are associated with the advantage of the possibility of attaching also unilaterally conical surfaces to existing cylindrical flanges, this in the corresponding design also together with metal gaskets.

This enables many new applications without connecting expensive adapter pieces which require a large amount of space in between and without the need to modify an existing system, for example, by cutting off the old and welding on new flanges.

Together with a corresponding tensioning device an especially simple and cheap solution is possible in that all thrust pieces can be made the same and can be completely uniformly distributed around the periphery of the flange. This is very important for large sealing forces (metal gaskets) and/or high pressures and likewise in the presence of low or high temperatures with the corresponding temperature changes or heating processes.

BRIEF DESCRIPTION OF THE DRAWINGS

Embodiments of the invention are detailed below using the drawings.

DESCRIPTION OF THE PREFERRED EMBODIMENTS

Figure 1:
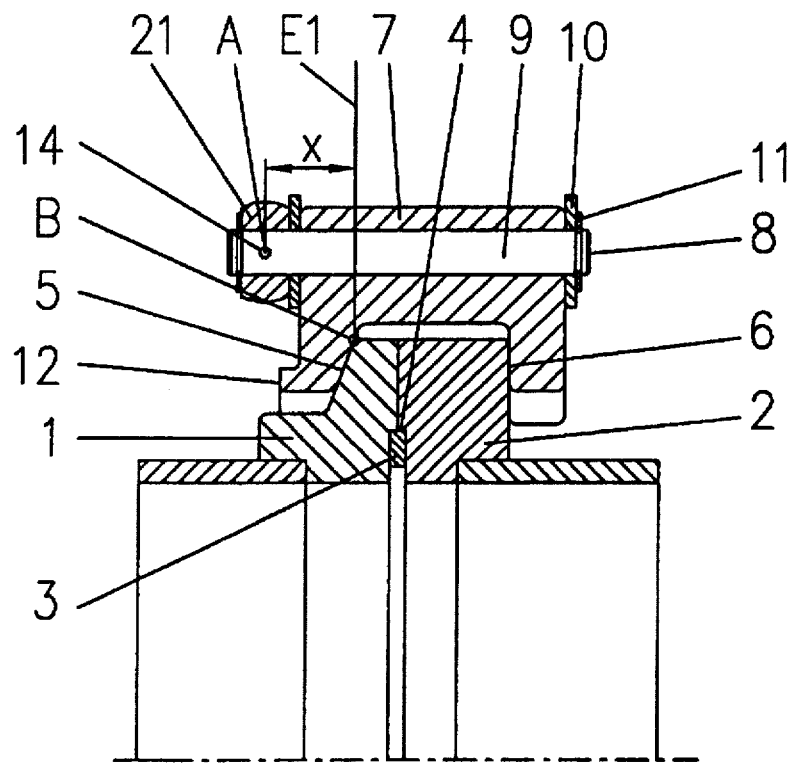
FIG. 1 shows an axial section through a thrust piece of a device according to the invention together with flanges and seal of a pipe connection.
Figure 4:
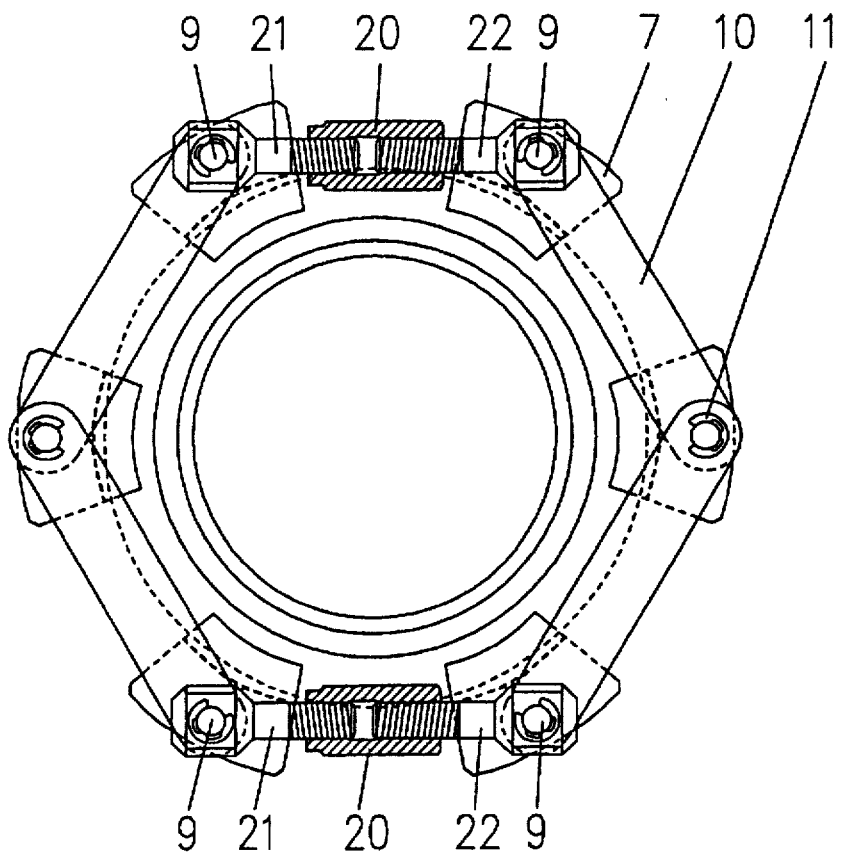
FIG. 4 shows a front view of one such device with two tensioning devices on a smaller scale and with only one pin per thrust piece for link plate attachment.

FIG. 1 shows a pipe connection with conical flange 1 and cylindrical flange 2 between which there is seal 3. This seal is also used to center flange 1 and 2 on opposite sides via shoulder 4. Flange 1 has a conical outer surface abutted by conical flank 5 of thrust piece 7. Flange 2 has a flat, annular side surface abutted by flat, annular flank 6 of thrust piece 7. Thrust piece 7 is located in a tension chain, for example, as shown in FIG. 4, and is pivotally mounted in one chain joint 8. Chain joint 8 is formed in the embodiment by pin 9. Link plates 10 which join the chain joint to an adjacent chain joint in the tension chain are also supported on pin 9. Link plates 10 are arranged externally on thrust piece 7 and are secured by lock washers 11.

Thrust piece 7 furthermore on at least one side has at least edge 12 which is drawn to the outside, which extends in the direction of the width of the thrust piece in the area of link plates 10, and which in interaction with link plates 10 limits the swivelling capacity of thrust piece 7 with respect to the link plates.

On pin 9 is also supported element 21 of a tensioning device which is used to draw two adjacent chain joints in the tension chain towards one another. The tensioning device with element 21 is located on one side on the side of conical flank 5 of the thrust piece so that tensile forces A which are exerted by the tensioning device on the two adjacent chain joints, together with the opposing forces—including the friction of thrust pieces 7 on flanges 1 and 2—acting on thrust pieces 7, do not generate a significant torque clockwise according to FIG. 1 on the thrust pieces. This is the case when tensile forces A run in one plane E1 or at a distance x outside of plane E1 or at most slightly inside of this plane. Plane E1 is perpendicular to the axes of the chain joints and passes through edge B of conical flank 5 which is nearer the other flank 6. "Outside" of plane E1 means that tensile force A runs on the side of plane E1 facing away from second flank 6. The described unilateral arrangement is necessary in order that the tension chain is not drawn together obliquely on the side which is the right side in FIG. 1. By means of the unilateral arrangement of the tensioning device a torque acts counterclockwise on all chain links according to FIG. 1 and is absorbed by flanks 5 and 6.

Figure 2:
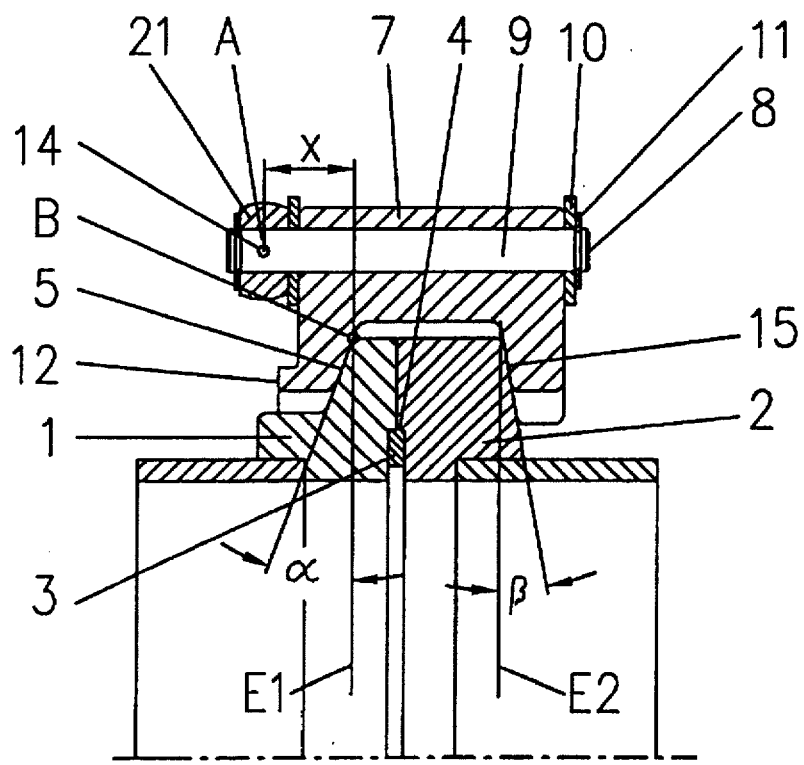
FIG. 2 shows one form of the thrust piece with different flank angles.

Thrust piece 7 shown in FIG. 2 differs from the thrust piece according to FIG. 1 in that second flank 15 is likewise conical. Flank 15 forms angle β with plane E2 which is perpendicular to the axes of the chain joints. (in FIG. 1 this angle is equal to zero). Angle β is however smaller than angle α between first flank 5 and plane E1 which is perpendicular to the axes of the chain joints.

Figure 3:
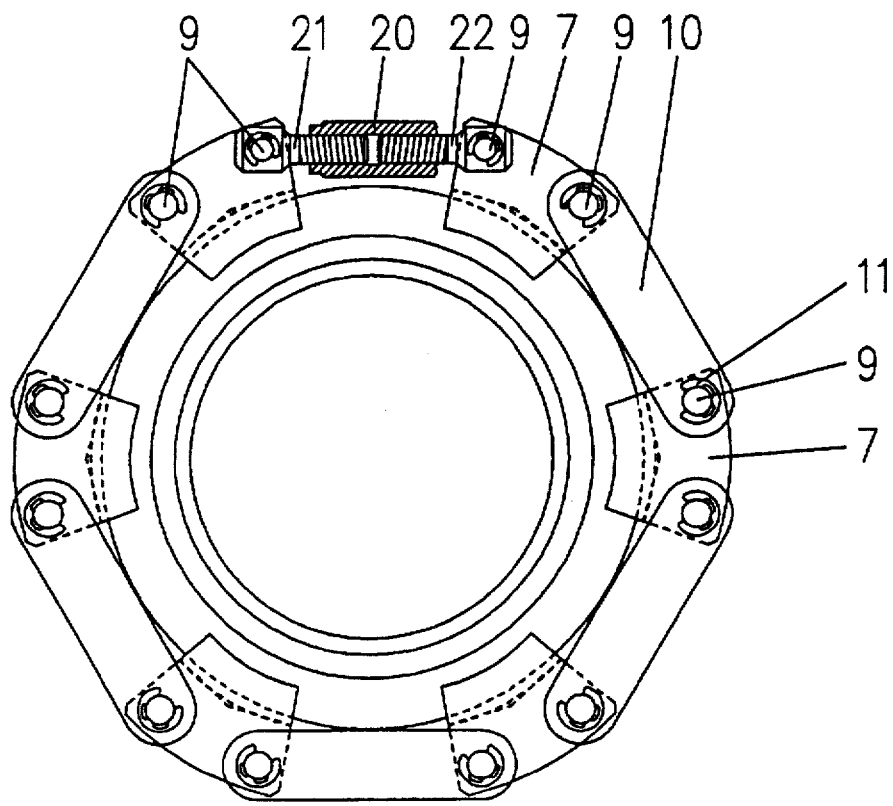
FIG. 3 shows a front view of one such device with one tensioning device on a smaller scale and with two pins per thrust piece for the link plate attachment.

FIG. 3 shows a device according to the invention in a front view and it is apparent how thrust pieces 7 form a tension chain with chain hinge pins 9 and link plates 10. Each thrust piece 7 in this embodiment bears two hinge pins 9. The arrangement of the tensioning device which consists of nut 20 and two eye screws 21 and 22 is likewise apparent. The two eye screws have a right hand and a left hand thread so that by turning nut 20 which has the corresponding inside thread the closure can be tensioned. Two eye screws 21 and 22 are likewise supported on hinge pin 9. The device contains only one tensioning device on the periphery of the tension chain and the tensioning device replaces link plates 10 between two adjacent hinge pins 9.

FIG. 4 shows a device as in FIG. 3, however with two tensioning devices 20, 21, 22 located on the periphery in order to be able to achieve more uniform tightening. The use of only one pin 9 per thrust piece 7 is shown as one version here.

Figure 5:
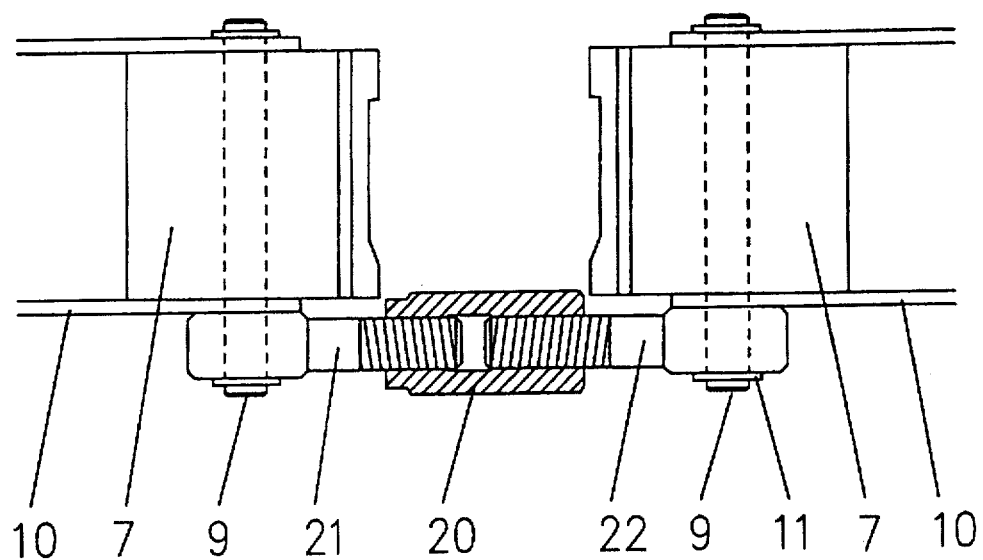
FIG. 5 and FIG. 6 show two versions for attachment of the tensioning device to the thrust pieces.

In FIG. 5 the same arrangement of tensioning device 20, 21, 22 is shown. Two eye screws 21 and 22 are supported outside of link plates 10 on same pins 9 and are held by lock washers 11. Thrust pieces 7 here have only one pin 9 as in FIG. 4.

Figure 6:
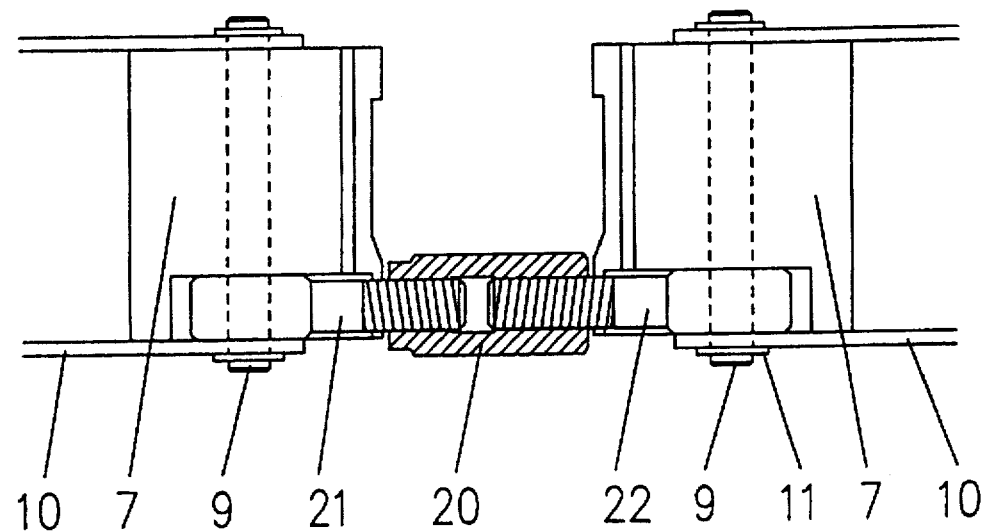

FIG. 6 shows the same arrangement, but with support of eye screws 21 and 22 within link plates 10. It can also be seen that between two pins 9 which are shown the link plates on both sides are replaced by unilateral tensioning device 20, 21, 22.

Figure 7:
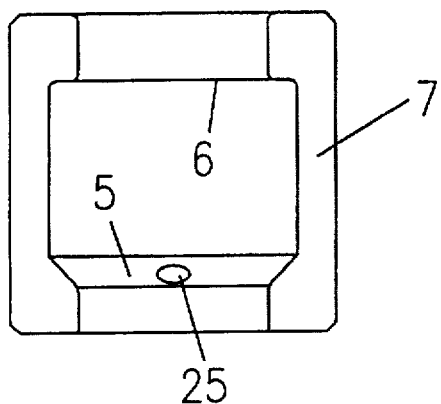
FIG. 7 shows in one view from the inside a thrust piece in which a bearing surface is formed in one conical flank.
Figure 9:
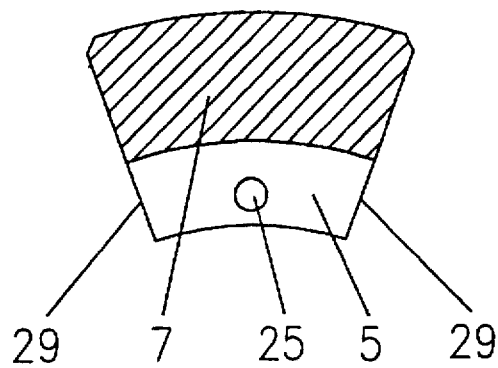
FIG. 9 shows one section according to line L1—L1 in FIG. 8.
Figure 8:
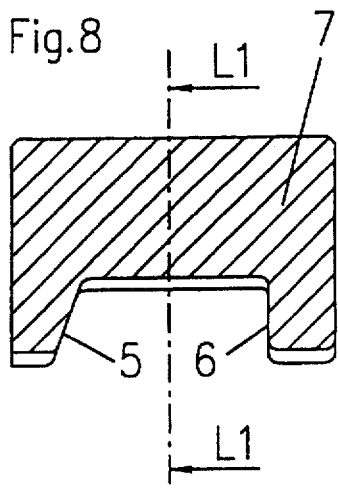
FIG. 8 shows one axial section through the thrust piece of FIG. 7.

FIG. 7 and 9 show the formation of conical flank 5 of thrust piece 7 with a bearing surface 25 which is achieved by the radius of this surface 25 being greater than the outside diameter of conical flange 1. This is feasible in order to achieve a controlled bearing surface even when the radial position of thrust piece 7 is not exactly right with respect to flange 1.

When the diameter ratio of the curvature of flank 5 of thrust piece 7 is accurately matched to flange 1—without bearing surface 25—at the start of tensioning of the tension chain and pressing of seal 3 only one support would form on ends 29 of thrust piece 7, by which flange 1 could be damaged. This support would only later, when the theoretically correct radial position of thrust piece 7 is reached, pass into surface pressure on flank 5 and still later, after passing this radius position, pass into a support in the center area of flank 5.

Conversely, with bearing surface 25 a support is immediately achieved in the center area of flank 5, and thus also controlled surface pressure in each radial position of thrust piece 7.

Figure 10:
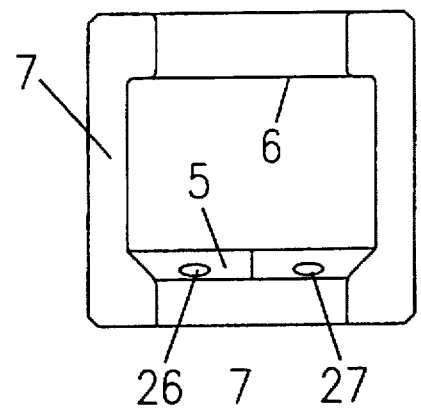
FIG. 10 shows in one view from the inside a thrust piece in which one conical flank is divided into two segments and in each segment one bearing surface each is formed.
Figure 12:
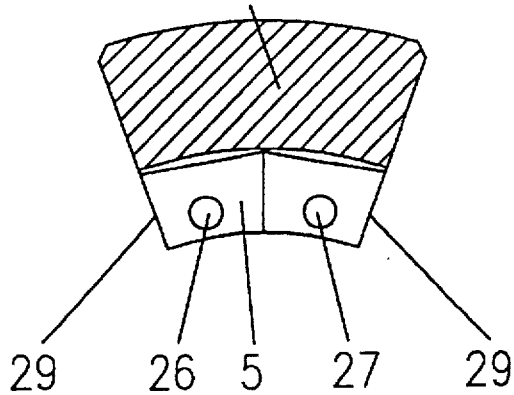
FIG. 12 shows an axial section according to line L2—L2 in FIG. 11.
Figure 11:
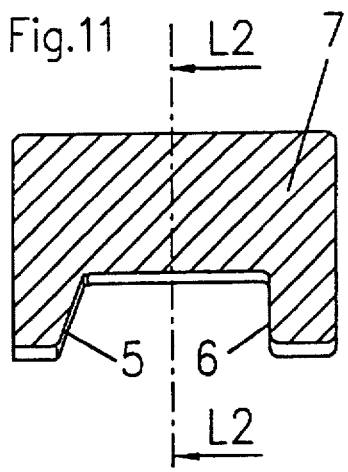
FIG. 11 shows an axial section through the thrust piece from FIG. 10

FIGS. 10 and 12 show the formation of conical flanks 5 of thrust piece 7 with two bearing surfaces 26 and 27. The latter are formed by thrust piece 7 here consisting of two segments which each correspond to the thrust piece shown in FIGS. 7 and 9. With two bearing surfaces 26 and 27 on each thrust piece 7 twice the number of bearing points on the flange periphery are achieved.

I claim:

1. In a device for pressing two flanges of a pipe connection against one another, including a tension chain with link plates and thrust pieces which are joined to one another to swivel via joints with parallel axes, each thrust piece having two flanks for resting against the flanges, and at least one tensioning device for drawing two adjacent joints against one another, the improvement wherein:

the first of the flanks of each thrust piece is tilted at a first angle to a first plane perpendicular to the axes of the joints;

the second of the flanks of each thrust piece forms a second angle which is smaller than the first angle with a second plane perpendicular to the axes of the joints;

the tensioning device is arranged such that tensile forces exerted by the tensioning device on two adjacent joints run on the side of the first plane facing away from the second flanks; and the first plane passes through an edge of the first flank of each thrust piece which edge is nearer the second flank than substantially any other portion of said first flank.

2. Device according to claim 1, wherein the second angle is approximately equal to zero.

3. Device according to claim 1, wherein all thrust pieces are the same and are located in the tension chain at approximately equal distances.

4. Device according to claim 1, wherein tensioning devices like link plates each join two adjacent joints to one another.

5. Device according to claim 1, wherein the tensioning device consists of two eye screws of which one bears a left-hand thread and the other bears a right-hand thread, and a common nut which accommodates the two threads.

6. Device according to claim 1, wherein the joints are formed by hinge pins, and wherein each thrust piece bears one hinge pin.

7. Device according to claim 1, wherein the joints are formed by hinge pins, and wherein each thrust bears two hinge pins.

8. Device according to claim 1, wherein the first flank of each thrust piece is designed such that it abuts only one defined bearing point on pertinent flange in different radial positions.

9. Device according to claim 1, wherein the first flank of each thrust piece is designed such that it abuts two defined bearing points on pertinent flange in different radial positions.

* * * * *